United States Patent [19]

Klemek

[11] 4,023,714

[45] May 17, 1977

[54] SHAKABLE DISPENSING DEVICE

[76] Inventor: Samuel D. Klemek, 1 Holman Road, Carmel Valley, Calif. 93924

[22] Filed: Mar. 29, 1976

[21] Appl. No.: 671,277

[52] U.S. Cl. .............................................. 222/196.1
[51] Int. Cl.² ............................................ B65G 65/70
[58] Field of Search .................. 222/196.1–196.4, 222/142.1, 142.2

[56] References Cited

UNITED STATES PATENTS

| 397,104 | 2/1889 | Ayer | 222/196.1 |
| 903,399 | 10/1908 | Nixon et al. | 222/196.4 X |
| 2,812,882 | 11/1957 | Osaka | 222/142.2 |

FOREIGN PATENTS OR APPLICATIONS

| 395,847 | 7/1933 | United Kingdom | 222/196.1 |

Primary Examiner—Stanley H. Tollberg
Assistant Examiner—Hadd Lane
Attorney, Agent, or Firm—Clarence M. Crews

[57] ABSTRACT

This invention relates to a storing and dispensing device for powdered or granular material, such as fertilizer for example, having provision for part or all of the following capabilities:

1. The jarring loose of caked or adhering material within the dispenser;
2. The dispensing of the material intermittently in chosen predetermined small quantities;
3. The dispensing of the material continuously at a chosen rate; and
4. The dispensing of the material with the dispensing end of the device pointed up or down.

4 Claims, 4 Drawing Figures

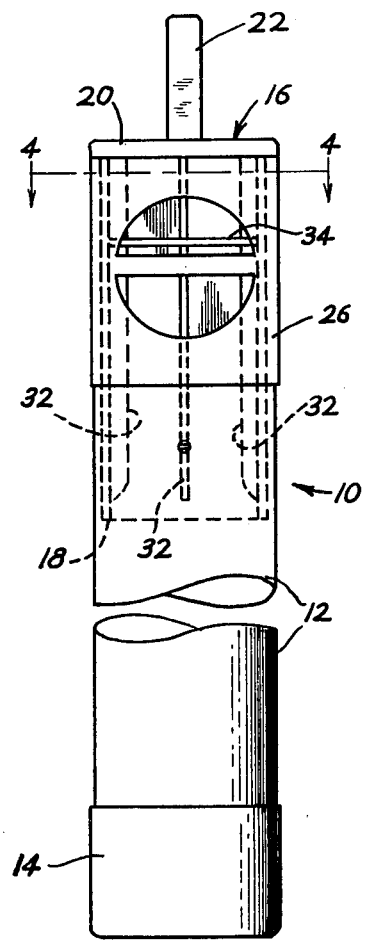
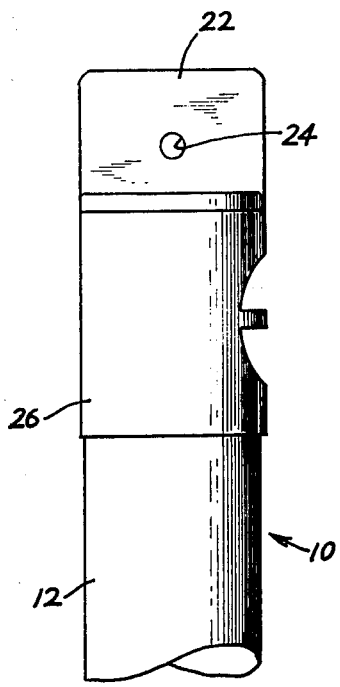
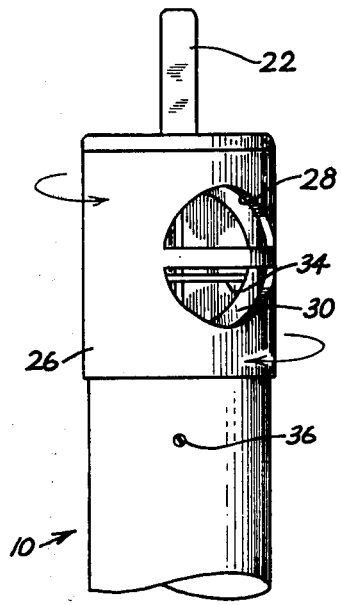
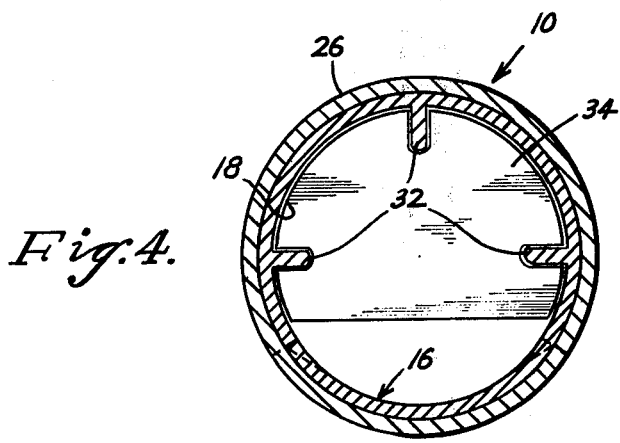
Fig. 1.
Fig. 2.
Fig. 3.
Fig. 4.

SHAKABLE DISPENSING DEVICE

This invention relates to a device for storing, and for discharging in selected, measured quantities, and/or at an adjustably regulated rate, powdered or granular material such as fertilizer.

The device desirably consists of two major units, the first one a cylindrical tube of fixed dimensions which is permanently closed at one end by a fixed closure member, and is covered at the other end by an interfitting, separably connected, measuring and dispensing unit.

The second unit includes a tubular portion having an open end that fits snugly, but removably for a short but significant distance into the open end of the first unit and is firmly but separably secured thereto by friction. The tubular portion of the second unit has a fixed cover which completely closes the free end of the unit and protrudes radially outward to provide a circular flange, desirably of substantially the same diameter as the tubular portion of the first unit.

The cover includes an upstanding diametrically disposed bumper which can be dragged along the ground or knocked against any fixed, unyielding object to dislodge and break up any caked material within the device.

A collar, desirably of essentially the same diameter as the tubular part of the first unit and the protruding flange of the second unit, is rotatably mounted on the second unit between these members.

The sleeve portion of the second unit is formed with a filling and dispensing lateral opening, desirably circular and desirably of no greater diameter than the fixed sleeve portion of the second unit. A like opening is provided in the collar. By rotation of the collar the filling and dispensing opening of the collar may be adjusted to a completely open condition, a completely closed condition, or any desired intermediate condition, for regulating the rate of discharge of the contained material.

The tubular portion of the second unit is desirably formed with internal, longitudinally extending, parallel ribs. A partition member, notched to fit the ribs, divides the interior of the device into a large storage chamber and a comparatively small measuring and dispensing chamber. The partition member is accessible through the composite dispensing opening and may be manually adjusted up or down along the ribs to determine and adjustably fix the capacity of the measuring chamber. The partition member will frictionally hold any position to which it can be manually adjusted.

Other objects and advantages will hereinafter appear.

In the drawing forming part of this specification,

FIG. 1 is a view in front elevation of my novel dispensing device, broken away intermediate its ends for compactness of illustration;

FIG. 2 is a fragmentary view in side elevation of the dispensing end of the device;

FIG. 3 is a fragmentary view in elevation showing the dispensing end partially closed; and FIG. 4 is a sectional view taken on the line 4—4 of FIG. 1, looking in the direction of the arrows.

The storing and dispensing device 10 shown herein as illustrative of the invention includes a tubular unit which consists of a rigid, hollow cylindrical member 12 which may be composed or cardboard, metal, plastic or other suitable material, and a sealing cap 14 at one end thereof which fits snugly enough normally to remain in place, but which can be conveniently removed for filling purposes.

At its end opposite to the sealing cap 14 the open end of the tubular member 12 has fixedly but removably secured to it a second unit 16.

The second unit 16 includes a tubular portion 18 of a diameter to fit snugly into the tubular portion 12 of the first unit. The tubular portion 18 of the second unit is closed at its free end by an integral closing portion 20 which extends outward far enough, at least, to form a flange of essentially the same diameter as the external diameter of the tubular member 18.

The portion 20 has integral with it an upstanding, diametrically disposed bumper 22, which may be knocked against the ground or any available solid object to loosen any caked material within the device. The bumper 22 is formed with a transverse hole 24 whereby it may be hung on a hook for storage, or may be suspended on a spring scale for determining the weight of the empty device and of the partially of fully foaded device.

A sleeve 26, snugly, rotatably mounted on the tubular portion 18 of the member 16, is formed with a side opening 28. The side opening 28 has a suitable location, shape and size to expose all of a side opening 30 of member 18, any desired portion of said opening, or none at all.

It will be clearly apparent that the rate of discharge of the contained material will be influenced by the angular setting of the collar 26.

Provision is also made for discharging a measured quantity of the powder or granulated material at each of a succession of operations, such as the successive fertilization of individual potted plants.

To this end, the sleeve 18 is formed with a plurality of internally projecting, longitudinally extending, parallel ribs 32, preferably three, and a washer 34 or like device, notched to fit the ribs, is mounted with capacity for adjustment to any desired position along the ribs.

By this means the space within the device is divided into a small measuring chamber of adjustably fixed size, and a large storage chamber whose exact size is of no material concern.

The device may be filled, either partially or to its maximum capacity, through the dispensing opening or by temporarily detaching the two units of the device. The units are normally joined by one or more through fasteners such as screw 36.

The provision of a measuring chamber of adjustable capacity is a significantly novel feature.

The provision of a bumper for jarring loose caked material is a feature of significant novelty and utility.

The bumper is desirably made to point toward the center of the fixed dispensing opening 30 of the dispensing unit, and thus serves to guide the user in the orientation of the device.

The suspension opening 24 through the bumper is useful both for storing the device and for weighing on a spring scale to determine the quantity of contained material.

I have described what I believe to be the best embodiment of my invention. What I desire to cover by letters patent, however, is set forth in the appended claims.

I claim:

1. A dispensing device for powdered or granular material such as fertilizer which includes, in combination, a. a first unit comprising a reservoir member of uniformly circular cross-section at the discharge end thereof and closed at the opposite end,
b. a second unit that includes
b1. a second tubular member of uniform, circular cross-section that fits snugly for a substantial distance into the unclosed end portion of the first unit and projects for a substantial distance outward beyond the discharge end of the first unit, is frictionally secured thereto, and has a dispensing opening in one side thereof,
b2. a closure portion for the free end of the second tubular member that includes a protruding flange and
c. a sleeve rotatively fitted on the second tubular member between the reservoir member and the flange of the second tubular member, and having a lateral discharge opening which, through rotation of the sleeve, may be set to expose all or any desired part of the dispensing opening of the second tubular member.

2. A dispensing device as set forth in claim 1 in which the second unit includes a bumper through which caked material may be rendered fluent the bumper being disposed to extend diametrically across the second unit, and to point diametrically toward the mid-portion of the discharge opening of the second unit.

3. A dispensing device as set forth in claim 2 in which the bumper extends diametrically across the second unit, and points toward the mid-portion of the discharge opening of the second unit.

4. A dispensing device as set forth in claim 1 in which the second unit includes a plurality of inwardly protruding ribs, and a partition member notched to fit and slide along the ribs for manual adjustment, the construction and arrangement being such that the partition member can be adjusted manually to divide the interior of the device into a small measuring chamber of selected capacity and a comparatively large storage chamber, so that various comparatively small quantities of predetermined selected mass can be repeatedly collected in, and discharged and/or a comparatively large quantity of material can be discharged at a substantially uniform rate.

* * * * *